(12) United States Patent
Harrigan et al.

(10) Patent No.: US 7,367,530 B2
(45) Date of Patent: May 6, 2008

(54) AEROSPACE VEHICLE YAW GENERATING SYSTEMS AND ASSOCIATED METHODS

(75) Inventors: Jeffery S. Harrigan, Seattle, WA (US); Henry L. Beaufrere, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/158,198

(22) Filed: Jun. 21, 2005

(65) Prior Publication Data

US 2006/0284022 A1   Dec. 21, 2006

(51) Int. Cl.
  *G05D 1/12* (2006.01)
(52) U.S. Cl. ............... 244/184; 244/195; 244/99.1; 244/99.11
(58) Field of Classification Search ......... 244/184, 244/195, 99.1, 99.11, 99.12
  See application file for complete search history.

(56) References Cited

U.S. PATENT DOCUMENTS

| | | |
|---|---|---|
| 1,770,575 A | 7/1930 | Ksoll |
| 2,387,492 A | 10/1945 | Blaylock et al. |
| 2,422,296 A | 6/1947 | Flader et al. |
| 2,458,900 A | 1/1949 | Emy |
| 2,652,812 A | 9/1953 | Fenzl |
| 2,665,084 A | 1/1954 | Feeney et al. |
| 2,864,239 A | 12/1958 | Taylor |
| 2,891,740 A | 6/1959 | Campbell |
| 2,892,312 A | 6/1959 | Allen et al. |
| 2,920,844 A | 1/1960 | Marshall et al. |
| 2,990,144 A | 6/1961 | Hougland |
| 2,990,145 A | 6/1961 | Hougland |
| 3,102,607 A | 9/1963 | Roberts |
| 3,112,089 A | 11/1963 | Dornier |
| 3,136,504 A | 6/1964 | Carr |
| 3,241,077 A | 3/1966 | Smyth et al. |
| 3,347,498 A | 10/1967 | Priestley et al. |

(Continued)

FOREIGN PATENT DOCUMENTS

EP   0 103 038   3/1984

(Continued)

OTHER PUBLICATIONS

U.S. Appl. No. 09/714,026, Sakurai.

(Continued)

*Primary Examiner*—Timothy D. Collins
(74) *Attorney, Agent, or Firm*—Perkins Coie LLP

(57) ABSTRACT

Aerospace vehicle yaw generating systems and associated methods are disclosed herein. One aspect of the invention is directed toward a yaw generating system that can include an aerospace vehicle having a fuselage with a first portion and a second portion. The system can further include a movable control surface coupled to the fuselage and extending generally in a horizontal plane. The control surface can be movable to a deflected position in which the control surface can be positioned to create a flow pattern proximate to the fuselage when the aerospace vehicle is located in a flow field. The flow pattern can be positioned to create a pressure differential between the first portion of the fuselage and the second portion of the fuselage. The first and second portions can be located so that the pressure differential produces a yawing moment on the aerospace vehicle.

24 Claims, 6 Drawing Sheets

U.S. PATENT DOCUMENTS

| | | |
|---|---|---|
| 3,374,966 A | 3/1968 | Howard |
| 3,375,998 A | 4/1968 | Alvarez-Calderon |
| 3,447,763 A | 6/1969 | Allcock |
| 3,504,870 A | 4/1970 | Cole et al. |
| 3,556,439 A | 1/1971 | Autry et al. |
| 3,653,611 A | 4/1972 | Trupp et al. |
| 3,704,828 A | 12/1972 | Studer et al. |
| 3,704,843 A | 12/1972 | Jenny |
| 3,734,432 A | 5/1973 | Low |
| 3,743,219 A | 7/1973 | Gorges |
| 3,794,276 A | 2/1974 | Maltby et al. |
| 3,831,886 A | 8/1974 | Burdges et al. |
| 3,836,099 A | 9/1974 | O'Neill et al. |
| 3,837,601 A | 9/1974 | Cole |
| 3,862,730 A | 1/1975 | Heiney |
| 3,902,686 A | 9/1975 | Wykes et al. |
| 3,910,530 A | 10/1975 | James et al. |
| 3,941,334 A | 3/1976 | Cole |
| 3,941,341 A | 3/1976 | Brogdon, Jr. |
| 3,968,946 A | 7/1976 | Cole |
| 3,992,979 A | 11/1976 | Smith |
| 3,994,451 A | 11/1976 | Cole |
| 4,015,787 A | 4/1977 | Maieli et al. |
| 4,117,996 A | 10/1978 | Sherman |
| 4,120,470 A | 10/1978 | Whitener |
| 4,131,253 A | 12/1978 | Zapel |
| 4,146,200 A | 3/1979 | Borzachillo |
| 4,171,787 A | 10/1979 | Zapel |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,240,255 A | 12/1980 | Benilan |
| 4,262,868 A | 4/1981 | Dean |
| 4,275,942 A | 6/1981 | Steidl |
| 4,285,482 A | 8/1981 | Lewis |
| 4,293,110 A | 10/1981 | Middleton |
| 4,312,486 A | 1/1982 | McKinney |
| 4,351,502 A | 9/1982 | Statkus |
| 4,353,517 A | 10/1982 | Rudolph |
| 4,368,937 A | 1/1983 | Palombo et al. |
| 4,384,693 A | 5/1983 | Pauly |
| 4,427,168 A | 1/1984 | McKinney |
| 4,441,675 A | 4/1984 | Boehringer |
| 4,455,004 A | 6/1984 | Whitaker |
| 4,461,449 A | 7/1984 | Turner |
| 4,466,586 A * | 8/1984 | Burnham ................. 244/99.12 |
| 4,471,927 A | 9/1984 | Rudolph |
| 4,472,780 A * | 9/1984 | Chenoweth et al. ........... 701/4 |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch |
| 4,533,096 A | 8/1985 | Baker |
| 4,553,722 A | 11/1985 | Cole |
| 4,562,546 A | 12/1985 | Wykes |
| 4,575,030 A | 3/1986 | Gratzer |
| 4,576,347 A | 3/1986 | Opsahl |
| 4,598,888 A | 7/1986 | Beteille |
| 4,598,890 A * | 7/1986 | Herzog et al. .............. 244/230 |
| 4,637,573 A | 1/1987 | Perin |
| 4,649,484 A * | 3/1987 | Herzog et al. ................. 701/3 |
| 4,650,140 A | 3/1987 | Cole |
| 4,700,911 A | 10/1987 | Zimmer |
| 4,702,441 A | 10/1987 | Wang |
| 4,706,902 A | 11/1987 | Destuynder |
| 4,706,913 A | 11/1987 | Cole |
| 4,717,097 A | 1/1988 | Sepstrup |
| 4,729,528 A | 3/1988 | Borzachillo |
| 4,744,532 A * | 5/1988 | Ziegler et al. ............. 244/78.1 |
| 4,784,355 A | 11/1988 | Brine |
| 4,786,013 A | 11/1988 | Pohl |
| 4,796,192 A | 1/1989 | Lewis |
| 4,814,764 A * | 3/1989 | Middleton .................. 340/967 |
| 4,821,981 A | 4/1989 | Gangsaas |
| 4,856,735 A | 8/1989 | Lotz |
| 4,899,284 A | 2/1990 | Lewis |
| 4,962,902 A | 10/1990 | Fortes |
| 5,027,893 A | 7/1991 | Cetinkaya |
| 5,046,688 A | 9/1991 | Woods |
| 5,050,081 A | 9/1991 | Abbott et al. |
| 5,060,889 A * | 10/1991 | Nadkarni et al. ........... 244/183 |
| 5,072,893 A | 12/1991 | Chakravarty |
| 5,074,495 A | 12/1991 | Raymond |
| 5,082,207 A | 1/1992 | Tulinius |
| 5,082,208 A | 1/1992 | Matich |
| 5,088,665 A | 2/1992 | Vijgen |
| 5,094,411 A | 3/1992 | Rao |
| 5,094,412 A | 3/1992 | Narramore |
| 5,100,082 A | 3/1992 | Archung |
| 5,114,100 A | 5/1992 | Rudolph |
| 5,129,597 A | 7/1992 | Manthey |
| 5,135,186 A | 8/1992 | Ako |
| 5,158,252 A | 10/1992 | Sakurai |
| 5,167,383 A | 12/1992 | Nozaki |
| 5,186,416 A | 2/1993 | Fabre |
| 5,203,619 A | 4/1993 | Welsch |
| 5,207,400 A | 5/1993 | Jennings |
| 5,224,667 A | 7/1993 | Lacabanne |
| 5,244,269 A | 9/1993 | Harriehausen |
| 5,259,293 A | 11/1993 | Brunner |
| 5,351,914 A | 10/1994 | Nagao |
| 5,375,793 A * | 12/1994 | Rivron et al. .............. 244/99.8 |
| 5,375,794 A | 12/1994 | Bleeg |
| 5,420,582 A | 5/1995 | Kubbat |
| 5,441,218 A | 8/1995 | Mueller |
| 5,452,865 A | 9/1995 | Tran |
| 5,458,304 A * | 10/1995 | Gilbert ..................... 244/90 B |
| 5,474,265 A | 12/1995 | Capbern |
| 5,493,497 A * | 2/1996 | Buus ............................. 701/4 |
| 5,531,402 A * | 7/1996 | Dahl ........................ 244/99.2 |
| 5,535,852 A | 7/1996 | Bishop |
| 5,544,847 A | 8/1996 | Bliesner |
| 5,549,260 A | 8/1996 | Reed |
| 5,564,652 A * | 10/1996 | Trimbath ................... 244/99.1 |
| 5,598,991 A | 2/1997 | Nadkarni |
| 5,600,220 A | 2/1997 | Thoraval |
| 5,609,020 A | 3/1997 | Jackson |
| 5,657,949 A | 8/1997 | Deck |
| 5,667,166 A | 9/1997 | Tran |
| 5,669,582 A | 9/1997 | Bryant |
| 5,680,124 A | 10/1997 | Bedell |
| 5,686,907 A | 11/1997 | Bedell |
| 5,743,490 A | 4/1998 | Gillingham |
| 5,788,190 A | 8/1998 | Siers |
| 5,833,173 A | 11/1998 | Tran |
| 5,860,625 A | 1/1999 | Tran |
| 5,875,998 A | 3/1999 | Gleine |
| 5,908,176 A | 6/1999 | Gilyard |
| 5,921,506 A | 7/1999 | Appa |
| 5,927,656 A | 7/1999 | Hinkleman |
| 5,934,615 A | 8/1999 | Treichler |
| 5,978,715 A | 11/1999 | Briffe |
| 5,984,230 A | 11/1999 | Drazi |
| 6,015,117 A | 1/2000 | Broadbent |
| 6,045,204 A | 4/2000 | Frazier |
| 6,064,923 A | 5/2000 | Bilange et al. |
| 6,073,624 A | 6/2000 | Laurent |
| 6,076,767 A | 6/2000 | Farley et al. |
| 6,076,776 A | 6/2000 | Breitbach |
| 6,109,567 A | 8/2000 | Munoz |
| 6,161,801 A | 12/2000 | Kelm |
| 6,168,117 B1 | 1/2001 | Shinagawa |

| | | | |
|---|---|---|---|
| 6,189,830 B1 | 2/2001 | Schnelz | |
| 6,213,433 B1 | 4/2001 | Gruensfelder | |
| 6,227,487 B1 * | 5/2001 | Clark | 244/99.12 |
| 6,293,497 B1 | 9/2001 | Kelley-Wickemeyer | |
| 6,328,265 B1 | 12/2001 | Dizdarevic | |
| 6,349,798 B1 | 2/2002 | McKay | |
| 6,364,254 B1 | 4/2002 | May | |
| 6,375,126 B1 | 4/2002 | Sakurai | |
| 6,416,017 B1 | 7/2002 | Becker | |
| 6,443,394 B1 | 9/2002 | Weisend | |
| 6,446,911 B1 * | 9/2002 | Yount et al. | 244/195 |
| 6,484,969 B2 | 11/2002 | Sprenger | |
| 6,491,261 B1 * | 12/2002 | Blake | 244/213 |
| 6,499,577 B2 | 12/2002 | Kitamoto et al. | |
| 6,536,714 B2 | 3/2003 | Gleine et al. | |
| 6,547,183 B2 | 4/2003 | Farnsworth | |
| 6,554,229 B1 | 4/2003 | Lam | |
| 6,561,463 B1 * | 5/2003 | Yount et al. | 244/196 |
| 6,591,169 B2 | 7/2003 | Jones | |
| 6,598,829 B2 | 7/2003 | Kamstra | |
| 6,598,834 B2 | 7/2003 | Nettle | |
| 6,601,801 B1 | 8/2003 | Prow | |
| 6,622,972 B2 | 9/2003 | Urnes | |
| 6,625,982 B2 | 9/2003 | Van Den Bossche | |
| 6,644,599 B2 | 11/2003 | Perez | |
| 6,651,930 B1 | 11/2003 | Gautier et al. | |
| 6,745,113 B2 | 6/2004 | Griffin | |
| 6,796,534 B2 | 9/2004 | Beyer et al. | |
| 6,799,739 B1 | 10/2004 | Jones | |
| 6,802,475 B2 | 10/2004 | Davies et al. | |
| 2002/0046087 A1 | 4/2002 | Hey | |
| 2002/0074459 A1 | 6/2002 | Gleine et al. | |
| 2002/0100842 A1 | 8/2002 | Perez | |
| 2003/0058134 A1 | 3/2003 | Sherry | |
| 2003/0132860 A1 | 7/2003 | Feyereisen | |
| 2003/0183728 A1 * | 10/2003 | Huynh | 244/224 |
| 2004/0004162 A1 | 1/2004 | Beyer | |
| 2004/0046087 A1 | 3/2004 | Beyer et al. | |
| 2004/0059474 A1 | 3/2004 | Boorman | |
| 2004/0195464 A1 | 10/2004 | Vassberg et al. | |
| 2004/0245386 A1 | 12/2004 | Huynh | |
| 2005/0011994 A1 | 1/2005 | Sakurai et al. | |
| 2005/0017126 A1 | 1/2005 | McLean et al. | |
| 2005/0242234 A1 * | 11/2005 | Mahmulyin | 244/75.1 |
| 2006/0016927 A1 * | 1/2006 | Bath et al. | 244/7 C |

FOREIGN PATENT DOCUMENTS

| | | |
|---|---|---|
| EP | 0 293 018 A | 11/1988 |
| EP | 0 497 660 A1 | 1/1992 |
| EP | 0 742 142 A2 | 11/1996 |
| EP | 0 743 243 A1 | 11/1996 |
| EP | 0 947 421 | 10/1999 |
| EP | 1008515 | 6/2000 |
| EP | 1 016 589 B1 | 9/2003 |
| EP | 1 353 253 A1 | 10/2003 |
| EP | 1 375 343 A1 | 1/2004 |
| GB | 2 144 688 A | 3/1985 |
| JP | 07309298 | 11/1995 |

OTHER PUBLICATIONS

U.S. Appl. No. 09/921,212, Farnsworth.
U.S. Appl. No. 10/454,417, Neal V. Huynh.
U.S. Appl. No. 10/671,435, Robert Kelley-Wickemeyer.
U.S. Appl. No. 10/746,883, Boorman.
U.S. Appl. No. 10/746,912, Boorman.
U.S. Appl. No. 10/770,256, Speer.
U.S. Appl. No. 10/787,644, Tafs et al.
U.S. Appl. No. 10/789,100, Lacy et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
U.S. Appl. No. 10/868,234, Rampton et al.
U.S. Appl. No. 10/868,238, Dun.
U.S. Appl. No. 10/935,846, Good et al.
U.S. Appl. No. 10/955,686, Wheaton et al.
U.S. Appl. No. 10/959,629, Jones.
U.S. Appl. No. 11/048,320, Konings.
U.S. Appl. No. 11/051,738, Huynh et al.
U.S. Appl. No. 60/475,828, Whitener.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).
Drela, M., "Optimization Techniques in Airfoil Design," MIT Aero & Astro, 29 pages.
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
European Search Report for European Patent Application No. EP 03 07 7840, The Boeing Company, Nov. 4, 2003 (2 pgs.).
Flap Drive System, 777 Maintenance Manual, Publication Date: Circa 1994 (1 page).
Flap Transmission and Support, 777 Maintenance Manual, Publication Date: Circa 1994 (1 page).
Hansen, H., "Application of Mini-Trailing-Edge Devices in the Awiator Project," Airbus Deutschland, EGAG, Hunefeldstr. 1-5, D-28199 Bremen, Germany, 9 pages.
International Search Report, PCT/US03/19724/ Sep. 11, 2003, 5 pages.
Junkers JU 52/3M (2 pages); http://www.wpafb.af.mil/museum/outdoor/od16; [Accessed Aug. 7, 2003].
MOOG, Component Maintenance Manual, May 1994 (2 pgs).
Niu, Chen-Yen, Airframe Structural Design, Chen-Yeun Niu, Conmilit Press, 1988 (1 page).
Petrov, A.V., "Certain Types of Separated Flow over Slotted Wings," Fluid Mechanics—Soviet Research, vol. 7, No. 5, Sep.-Oct. 1978.
The High Speed Frontier, Chapter 2: The High-Speed Airfoil Program, "SUPERCRITICAL" AIRFOILS, 1957-1978 (4 pages); http://www.hq.nasa.gov/office/pao/History/SP-445/ch2-5.
TU 1-44 Canard, 1 pg, date unknown.
Whitcomb, Richard T., "Review of NASA Supercritical Airfoils," National Aeornautics and Space Administration, Aug. 1974 (pp. 8-18).
PCT International Search Report and Written Opinion for PCT/US2006/021499; Applicant: The Boeing Company; Dec. 27, 2006; 14 pages; European Patent Office.

* cited by examiner

AEROSPACE VEHICLE YAW GENERATING SYSTEMS AND ASSOCIATED METHODS

TECHNICAL FIELD

Embodiments of the present invention relate to aerospace vehicle yaw generating systems and associated methods, including using a spoiler surface to generate a low pressure area on a fuselage of an aerospace vehicle to create a yawing moment.

BACKGROUND

Aircraft are generally required to have certain directional stability and control characteristics. In order to achieve these characteristics, aircraft generally have vertical stabilizers and rudders. Often, the size of the vertical stabilizers, the size of the rudder(s), and the power of the rudder actuators (including the size and/or operating pressure of the associated hydraulic system(s)) of large multi-engine aircraft is determined by certain engine-out controllability requirements. For example, during aircraft certification, government agencies (e.g., the Federal Aviation Administration) often require manufacturers to determine minimum control speeds on the ground and in flight for engine failures at selected conditions.

The minimum control speed in-flight can include a calibrated airspeed at which, when a critical engine is suddenly made inoperative, it is possible to maintain control of the airplane during specific operating conditions. The minimum control speed on the ground can include a calibrated airspeed during the takeoff run at which, when a critical engine is suddenly made inoperative during selected operating conditions, it is possible to maintain control of the airplane using the rudder control alone while using normal piloting skills. In general, the higher the minimum control speeds an aircraft has, the more runway the aircraft requires for takeoff and/or landing. Accordingly, it is desirable to design aircraft to have low minimum control speeds.

Low minimum control speeds generally require large vertical stabilizing surfaces, larger rudder surfaces, and powerful rudder actuators (e.g., fast moving and/or high force rudder actuators). Larger surfaces and/or powerful actuators increase the weight of an aircraft and in many cases increase the complexity and manufacturing costs. Additionally, larger surfaces can increase drag during various phases of flight (e.g., during cruise flight) resulting in increased fuel usage and costs.

As described in U.S. Pat. No. 5,375,793, issued Dec. 27, 1994, which is fully incorporated herein by reference, manufacturers have considered using a fly-by-wire flight control system to momentarily deflect an aileron and/or a spoiler to create drag on a wing to cause a yawing moment to supplement the yawing moment created by the rudder during certain engine-out conditions. Accordingly, the yawing moment is proportional to the amount of drag created and the distance between where the drag force is applied and the aircraft's center of gravity ("c.g."). In order to increase the yawing moment the drag must be increased and/or the force must be applied further from the c.g. A problem with this solution is that increases in drag reduce the thrust-to-drag ratio of the aircraft, which can degrade engine-out performance (e.g., the ability for the aircraft to accelerate). Another problem with this solution is that creating the drag force further from the aircraft's c.g. requires a spoiler or aileron deflection on the outboard portion of the wing, which in many cases can create a rolling moment on the aircraft. In order to compensate for this rolling moment, other flight control surfaces must be deflected, which can increase pilot workload, increase flight control complexity, and/or add to overall aircraft drag.

SUMMARY

The present invention is directed generally toward aerospace vehicle yaw generating systems and associated methods, including using a spoiler surface to generate a pressure differential between a first portion and a second portion of a fuselage of an aerospace vehicle. The pressure differential can in turn create a yawing moment. Aspects of the invention are directed toward a yaw generating system that can include an aerospace vehicle having a fuselage with a first portion and a second portion. The system can further include a movable control surface coupled to the fuselage and extending generally in a horizontal plane. The control surface can be movable to a deflected position, in which the control surface is positioned to create a flow pattern proximate to the fuselage when the aerospace vehicle is located in a flow field. The flow pattern can be positioned to create a pressure differential between the first portion of the fuselage and the second portion of the fuselage. The first and second portions can be located so that the pressure differential produces a yawing moment on the aerospace vehicle.

Other aspects of the invention are directed toward a method for making a yaw generating system that can include locating a movable control surface proximate to a fuselage of an aerospace vehicle. The fuselage can have a first portion and a second portion. The method can further include coupling the movable control surface to the fuselage. The control surface can extend generally in a horizontal plane and can be movable to a deflected position. In the deflected position the control surface can be positioned to create a flow pattern when the aerospace vehicle is located in a flow field. The flow pattern can be located to create a pressure differential between the first portion of the fuselage and the second portion of the fuselage. The first and second portions of the fuselage can be located so that the pressure differential produces a yawing moment on the aerospace vehicle.

Still other aspects of the invention are directed toward a method for creating a yawing moment that can include placing an aerospace vehicle in a flow field. The method can further include positioning a control surface in a deflected position to create a pressure differential between a first portion of a fuselage and a second portion of the fuselage to produce a yawing moment on the aerospace vehicle. The control surface can be coupled to the fuselage and (a) can extend generally in a horizontal plane, (b) can be movable between a stowed position where the control surface is generally faired with a surface of the fuselage and the deflected position where the control surface can extend outwardly from a first side of the fuselage and away from a second side of the fuselage opposite the first side, or (c) both (a) and (b).

DETAILED DESCRIPTION

The present disclosure describes aerospace vehicle yaw generating systems and associated methods, including using a spoiler surface to generate a pressure differential between a first portion and a second portion of a fuselage of an aerospace vehicle to create a yawing moment. Several specific details of the invention are set forth in the following description and in FIGS. 1–7 to provide a thorough understanding of certain embodiments of the invention. One skilled in the art, however, will understand that the present invention may have additional embodiments, and that other embodiments of the invention may be practiced without several of the specific features described below.

Figure 1:
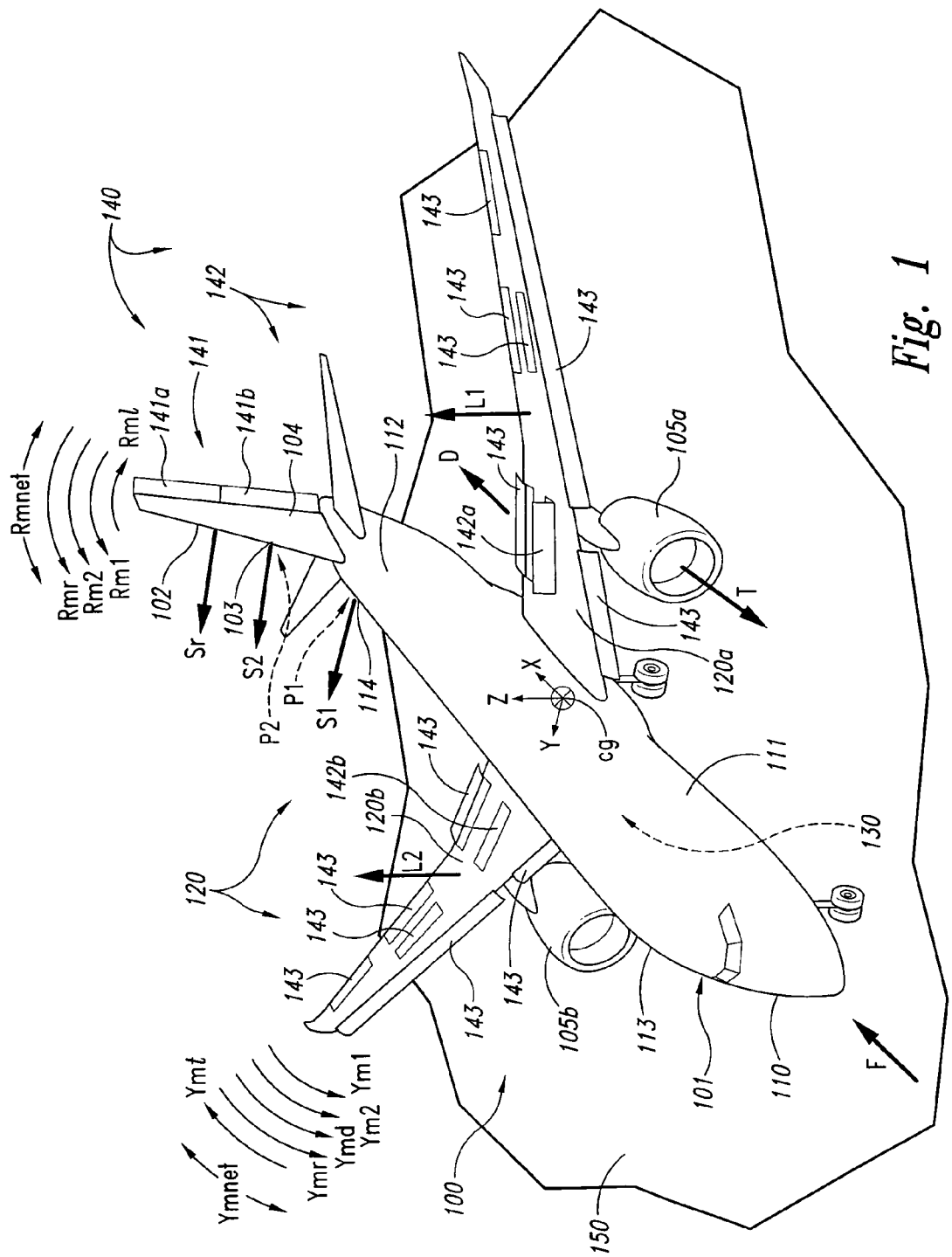
FIG. 1 is an isometric illustration of a system for creating a yawing moment in accordance with embodiments of the invention.

FIG. 1 illustrates embodiments of a system in which a control surface is used to generate a pressure differential between a first portion and a second portion of a fuselage of an aerospace vehicle to create a yawing moment. FIGS. 2–7 illustrate further details of the operation of the system shown in FIG. 1. Certain embodiments of the invention described below can be used to augment aircraft yaw control and/or directional stability during selected operating conditions (e.g., during an engine loss on takeoff).

In FIG. 1, a yaw generating system 100 includes an aerospace vehicle 101 with a fuselage 110, multiple wing sections 120, a flight control system 130, and control device(s) 140 that include at least one control surface 142 that is configured to create a pressure differential on the fuselage 110 to produce a yawing moment on the aerospace vehicle 101. In the illustrated embodiment, the fuselage 110 includes a first side 111 and a second side 113 generally opposite to the first side 111 relative to the X-Z plane (e.g., a vertical plane relative to the fuselage defined by the roll and yaw axes) in FIG. 1. A first wing section 120a is located proximate to the first side 111 of the fuselage 110 and a second wing section 120b is located proximate to the second side 113 of the fuselage 110.

In other embodiments, the system 100 can include more or fewer wing section(s) 120 and/or wing section(s) 120 having other configurations. For example, a wing section 120 can include a portion of any surface or airfoil section extending generally in a lateral direction (e.g., the surface can extend generally parallel to the Y axis shown in FIG. 1 with or without dihedral or anhedral) that is configured to generate lift when placed in a flow field F. For example, in certain embodiments the system 100 can include wing sections 120 that include portions of a canard and/or other wing sections that include portions of a main wing. In other embodiments, the wing section(s) 120 are coupled to the fuselage 110 without being directly connected to the fuselage 110. For example, the wing sections 120 can include airfoil sections that are suspended over or under the fuselage 110 (e.g., a biplane or tri-plane configuration).

In the illustrated embodiment, the control devices 140 include devices that can generate moments or forces to control the aerospace vehicle 101 during operation or flight (e.g., attitude thrusters, aerodynamic surfaces, and thrust vectoring nozzles). In FIG. 1, the control devices 140 include control surfaces 142, rudder surfaces 141, and other control devices 143. In other embodiments, the system 100 can include more or fewer control devices 140.

In FIG. 1, the control surfaces 142 include a first control surface 142a coupled to the first wing section 120a and a second control surface 142b coupled to the second wing section 120b. In the illustrated embodiment, the first and second control surfaces 142a, 142b include spoiler surfaces that are at least approximately symmetrically located in an X-Y plane (e.g., a horizontal plane) with respect to the fuselage. In other embodiments, the system 100 can include other arrangements of control surfaces 142, other types of control surfaces 142, and/or more or fewer control surfaces 142. For example, in other embodiments the control surfaces 142 can include flap or aileron surfaces.

In FIG. 1, the first control surface 142a is shown in a deflected position. In the deflected position, the first control surface 142a is positioned to create at least one flow pattern proximate to the fuselage 110 when the aerospace vehicle 101 is located in the flow field F. In the illustrated embodiment, the first control surface 142a is located within the first third of the wing span (e.g., fuselage to tip) and has created a first flow pattern proximate to the fuselage 110 that is positioned to create a first pressure differential P1 between a first portion 112 of the fuselage 110 and a second portion 114 of the fuselage 110. In the illustrated embodiment, the first and second portions 112, 114 of the fuselage are located so that the first pressure differential P1 produces a first side force S1 some distance from a "c.g." (center of gravity) of the aerospace vehicle 101 to produce a first yawing moment Ym1 about the yaw axis Z of the aerospace vehicle 101. In the illustrated embodiment, the first side force S1 is located aft of the c.g. In other embodiments (e.g., where the first control surface 142a is located on a canard), the first side force S1 can be located in front of the c.g. to produce the first yawing moment Ym1 in the opposite direction.

In the illustrated embodiment, the first portion 112 of the fuselage 110 is located on the first side 111 of the fuselage 110 and the second portion 114 of the fuselage 110 is located on the second side 113 of the fuselage 110, but the first and second portions are not located directly opposite one another. In other embodiments, the first and second portions 112, 114 are positioned directly opposite each other relative to the X-Z plane. In still other embodiments, the first and second portions 112, 114 can have other locations that produce the yawing moment Ym1. As discussed above, in FIG. 1 the first control surface 142a is located within the first third of the wing span, however, it is understood that the first control surface 142a can have other locations where the deflected position can create the first pressure differential on the fuselage.

In certain embodiments, the first control surface 142a can be positioned in the deflected position to create a second flow pattern proximate to a flow body 102 (e.g., a directional stabilizer, a vertical tail, a V-tail, a rudder surface, or a ventral fin) when the aerospace vehicle 101 is located in the flow field F. As used herein, flow body 102 refers to any flow body 102 on the aerospace vehicle 101 other than the fuselage. The second flow pattern can be positioned to create a second pressure differential P2 between a first portion 103 of the flow body 102 and a second portion 104 of the flow body 102. In the illustrated embodiment, the first and second portions 103, 104 of the flow body 102 are located so that the second pressure differential P2 produces a second side force S2 some distance from the c.g. of the aerospace vehicle 101 to produce a second yawing moment Ym2 on the aerospace vehicle 101.

In FIG. 1, the flow body 102 includes a vertical stabilizer that is located aft of the c.g. of the aerospace vehicle 101. Accordingly, the second side force S2 is located aft of the c.g. In other embodiments, the second side force S2 can be located in front of the c.g. to produce the second yawing moment Ym2 in the opposite direction (e.g., where the first control surface 142a is located on a canard and there is a flow body 102 positioned forward of the c.g.).

In certain embodiments, the first yawing moment Ym1 or the first and second yawing moments Ym1, Ym2 created by the first control surface 142a can be used to provide or augment directional stability and/or directional control of the aerospace vehicle 101 during selected operating conditions. Selected operating conditions can include a selected flow field condition relative to the aircraft (e.g., airspeed, angle of attack, angle of sideslip, altitude, and/or ambient pressure), a selected aircraft configuration (e.g., the position of various flight control surfaces and/or the operability of various systems), selected operator commands (e.g., control inputs from a pilot), and/or whether the aerospace vehicle 101 is on the ground or in-flight.

For example, in selected embodiments the first yawing moment Ym1 can be used to provide directional stability and control for an aircraft without vertical stabilizing surfaces throughout the flight envelope. In other embodiments, the first yawing moment Ym1 or the first and second yawing moments Ym1, Ym2 can be used to provide directional stability and/or directional control of an aircraft with a vertical stabilizer and rudder system when the rudder system experiences a partial or complete failure. In still other embodiments, the first yawing moment Ym1 or the first and second yawing moments Ym1, Ym2 can be used to augment directional stability and/or directional control of an aircraft in selected corners of a flight envelope where additional stability and/or control are required.

In yet other embodiments, the first yawing moment Ym1 or the first and second yawing moments Ym1, Ym2 can be used to provide directional stability and/or directional control of an aircraft with an asymmetric thrust condition (e.g., thrust loss, engine failure, or an engine-out condition). In FIG. 1, the aerospace vehicle 101 is on the ground 150 and has experienced a loss of thrust on the right engine 105b creating an asymmetric thrust condition. The left engine 105a is still producing thrust T. Because the thrust T is located a lateral distance from the c.g. of the aerospace vehicle 101, the thrust T creates a thrust yawing moment Ymt on the aerospace vehicle 101. An upper rudder surface 141a and a lower rudder surface 141b, both coupled to the flow body 102, have been deflected to create a rudder side force Sr aft of the c.g. of the aerospace vehicle 101, thereby producing a rudder yawing moment Ymr that is generally opposite to the thrust yawing moment Ymt.

The first control surface 142a is also used to produce a yawing moment to oppose the thrust yawing moment Ymt. In FIG. 1, the first control surface 142a has been deflected and, as discussed above, produces the first and second yawing moments Ym1, Ym2, which are also generally opposite to the thrust yawing moment Ymt. Additionally, in the deflected position the first control 142a can also interact with the flow field F to produce a drag force D. Because the drag force is located laterally some distance from the c.g., the drag force D can create a drag yawing moment Ymd, which is also generally opposite to the thrust yawing moment Ymt. In certain embodiments, the drag yawing moment Ymd is smaller than the first yawing moment Ym1 and/or the second yawing moment Ym2. During selected operating conditions the first yawing moment Ym1, the second yawing moment Ym2, the rudder yawing moment Ymr, and the drag yawing moment Ymd can counter the thrust yawing moment Ymt so that the net yawing moment Ymnet is balanced or has a zero value.

In other embodiments, the aerospace vehicle 101 can have more or fewer engines 150 and/or more or fewer rudder surfaces 141. In still other embodiments, the aerospace vehicle can have more or fewer yawing moments acting about the yaw axis Z and/or the yawing moments can have different directions. For example, in certain embodiments the failed engine can also produce a drag force that creates an additional yawing moment and/or the first control surface 142a does not produce the second yawing moment Ym2. In yet other embodiments, the system 100 includes only one control surface 142 to aid other control device(s) 140 in providing directional control during a loss of a critical engine during takeoff. As used herein, a critical engine includes an engine on a multiple engine aircraft that causes the largest deviation from runway centerline when the engine is lost during takeoff and the takeoff is continued. Although in FIG. 1 the aerospace vehicle 101 is shown on the ground, in other embodiments the aerospace vehicle 101 can be in-flight when the first control surface 142a is deflected to create the first yawing moment Ym1 or the first and second yawing moments Ym1, Ym2.

In certain embodiments, the first control surface 142a can produce the first and/or second yawing moments Ym1, Ym2 without creating a net rolling moment Rmnet about the roll axis X of the aerospace vehicle 101. For example, in FIG. 1 when the first control surface 142a is in the deflected position, a first amount of lift L1 created by the first wing section 120a is less than a second amount of lift L2 created by the second wing section 120b. Accordingly, a lift rolling moment Rm1 can be created. Additionally, because the first side force S1, the second side force S2, and the rudder side force Sr are positioned above the c.g. of the aerospace vehicle 101, a first rolling moment on Rm1, a second rolling moment Rm2, and a rudder rolling moment Rmr are created, respectively. In the illustrated embodiment, the first rolling moment Rm1, the second rolling moment Rm2, and the rudder rolling moment Rmr are generally opposite the lift rolling moment Rm1 resulting in a net rolling moment Rmnet that is balanced or has a zero value. This feature can be particularly advantageous when the aerospace vehicle is operated on or near the ground and/or when workload in the cockpit is high.

In other embodiments, the aerospace vehicle can have more or fewer rolling moments acting about the roll axis X and/or the rolling moments can have different directions. For example, in certain embodiments the first control surface 142a can be configured so that there is no loss of lift when the first control surface 142a is moved to the deflected position. In other embodiments, the first side force S1, the second side force S2, and/or the rudder side force Sr can be located so that they create no rolling moments or rolling moments in a direction different than that shown in FIG. 1. In still other embodiments, other control devices 140 can be used to balance the net rolling moment Rmnet (e.g., an aileron surface or an attitude thruster).

Figure 2:
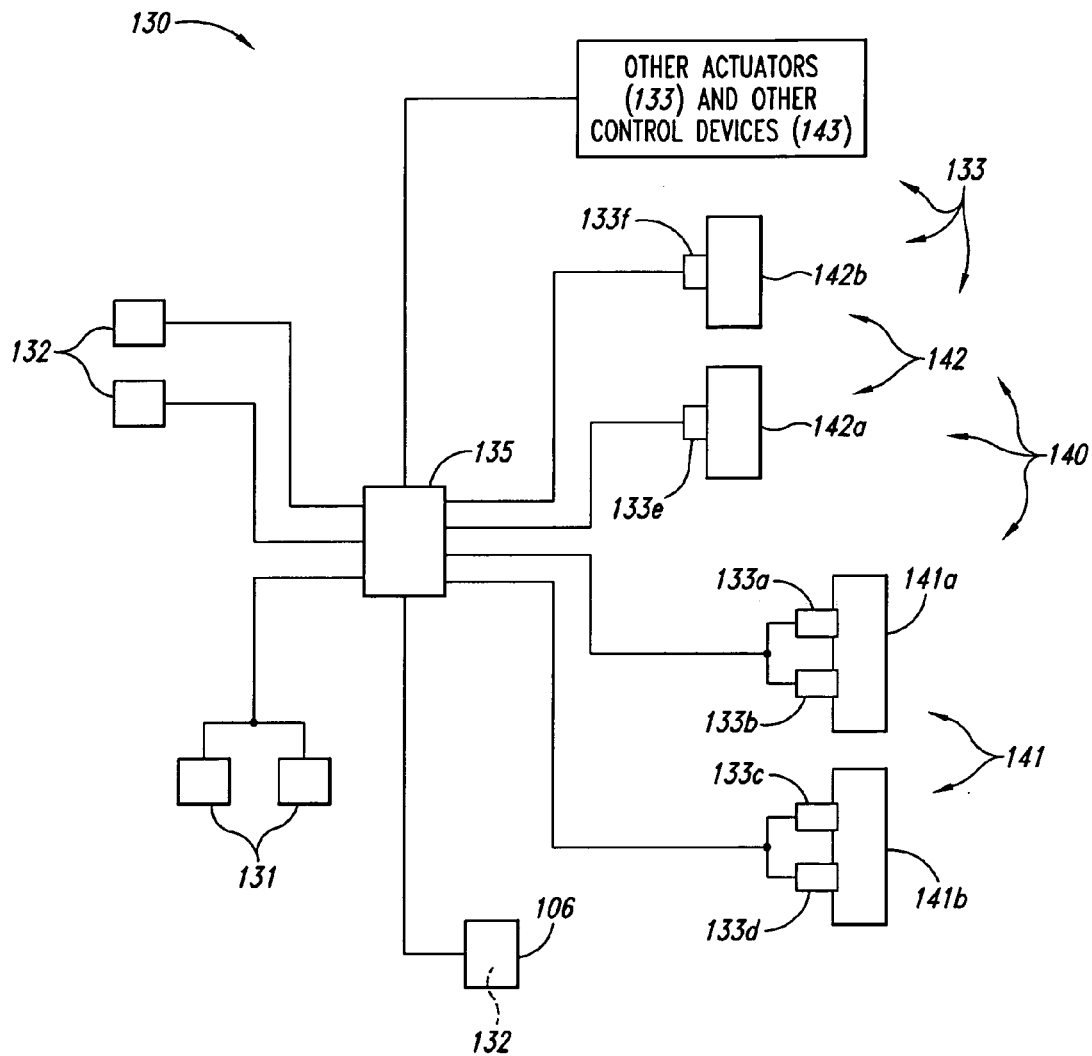
FIG. 2 is a schematic illustration of a flight control system portion of the system shown in FIG. 1.

In FIG. 1, the first control surface 142a is coupled to a control system 130. FIG. 2 is a partially schematic illustration showing further details of the control system 130 that includes a computer 135 (e.g., a programmable flight control computer), inceptors 131 (e.g., pilot control stick or yokes), sensors 132, and various actuators 133. The control system 130 can include an electrical control system, a mechanical control system, or a combination of the two. The control system 130 can be coupled to various aircraft systems including a landing gear system 106 and various control devices 140. The control devices 140 can include the control surfaces 142 and rudder surfaces 141 (discussed above with reference to FIG. 1), and other control devices 143 including attitude thrusters, thrust vectoring nozzles, and aerodynamic surfaces. For example, the other aerodynamic surfaces can include trailing edge flaps, leading edge devices, aileron surfaces, spoiler surfaces, elevator surfaces, and speed brakes.

In FIG. 2, the computer 135 is coupled to the upper rudder surface 141a via a first actuator 133a and a second actuator 133b to provide redundancy for the upper rudder surface. For example, each actuator 133 coupled to the upper rudder surface 141a can be operated by a separate power system (e.g., a separate hydraulic system) so if one power system fails, the other power system can still operate an actuator to move the upper rudder surface 141a. Similarly, the computer 135 is coupled to the lower rudder surface 141b via a third actuator 133c and a fourth actuator 133d. Additionally, the computer 135 can be coupled to the first control surface 142a by a fifth actuator 133e and to the second control surface 142b by a sixth actuator 133f. In certain embodiments, the number of actuators 133 on each rudder surface 141 can be reduced because the first and second control surfaces 142a, 142b can provide yaw control in the event that control of one or more rudder surfaces is lost or degraded.

In the illustrated embodiment, the sensors 132 can provide information to the computer 135, and the computer 135 can use this information to determine commands for the control devices 140. For example, in certain embodiments the sensors 132 can sense parameters that include airspeed, altitude, temperature, control device positions, angle of attack, side slip angle, attitude, inertial track, and/or the status of various aerospace vehicle systems. Other sensors 132 (e.g., up-lock sensors, down-lock sensors, and/or weight on wheel sensors) can provide information regarding the state of the landing gear system. The inceptors 131 can provide operator commands representing desired aircraft responses to the computer 135. The computer 135 can receive these commands and data from the sensors 132 to determine commands for the control devices 140.

The flight control system can determine when to move a control surface 142 to the deflected position, an amount of control deflection associated with the deflected position, and/or an amount of time a control surface 142 remains in the deflected position, based on the operating condition of the aerospace vehicle and/or the commands. For example, the first and/or second control surfaces 142a, 142b can be moved to the deflected position in response to operator selections made via the inceptors 131, or in response to signals transmitted automatically by the flight control system, or both. In other embodiments, the first and/or second control surfaces 142a, 142b are only controlled automatically by the flight control system 130 and operate only during selected conditions (e.g., only during an asymmetric thrust condition when the aerospace vehicle is operating at a selected airspeed range, is in flight, and/or is on the ground). In still other embodiments, the first and second control surfaces 142a, 142b are only moved to the deflected position via operator input through the inceptors 131.

In yet other embodiments, the flight control system 130 can have more or fewer elements, including more or fewer inceptors 131, sensors 132, actuators 133, computers 135, and/or other elements and can be coupled to more or fewer control devices 140. For example, in certain embodiments the flight control system 130 does not include the computer 135, and the inceptor(s) are configured to provide a direct input (e.g., mechanical or electrical) to the control surfaces 142 or to the actuators 133 coupled to the control surfaces 142. The actuators 133 can include any type of actuator, including mechanical, electrical, hydraulic, and/or pneumatic actuators. In other embodiments, control surfaces 142 are mechanically linked to the inceptors 131 without the use of actuators.

Figure 3:
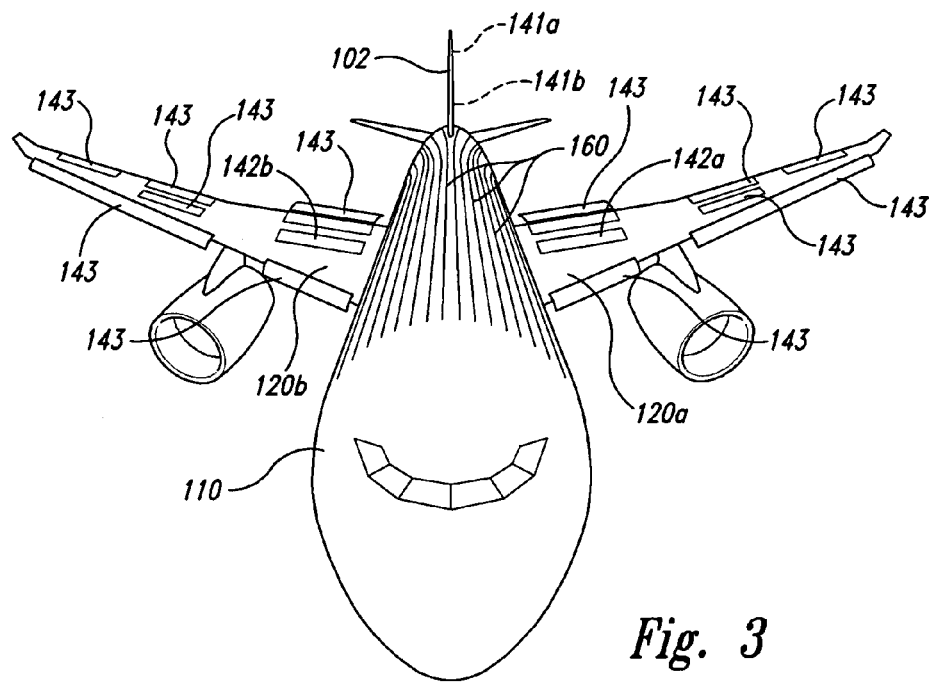
FIG. 3 is an isometric illustration of a portion of the system shown in FIG. 1 without a thrust asymmetry, without a rudder surface deflection, and where a first control surface and a second control surface are both in a first selected position.

The flow patterns created by the control surfaces proximate to the fuselage 110 and the flow body 102, are discussed in further detail with reference to FIGS. 3–5. FIG. 3 is an isometric illustration of a portion the system shown in FIG. 1 without a thrust asymmetry, without a rudder surface deflection, and where neither control surface is in a deflected position as discussed above with reference to FIG. 1. In FIG. 3, the first and second control surfaces 142a, 142b are symmetrically positioned relative to their respective first and second wing sections 120a, 120b. The flow lines 160 illustrate that the flow patterns proximate to the fuselage 110 and the flow body 102 are at least approximately symmetrical relative to the X-Z plane discussed with reference to FIG. 1.

Figure 4:
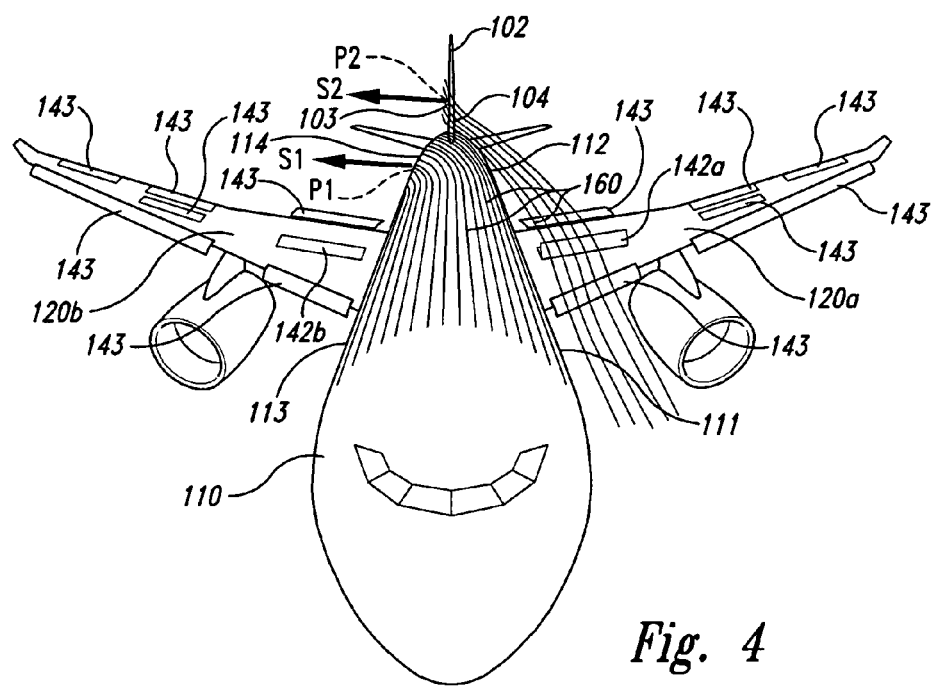
FIG. 4 is an isometric illustration of the portion of the system shown in FIG. 3, with the first control surface in a first deflected position and the second control surface in the first selected position.
Figure 5:
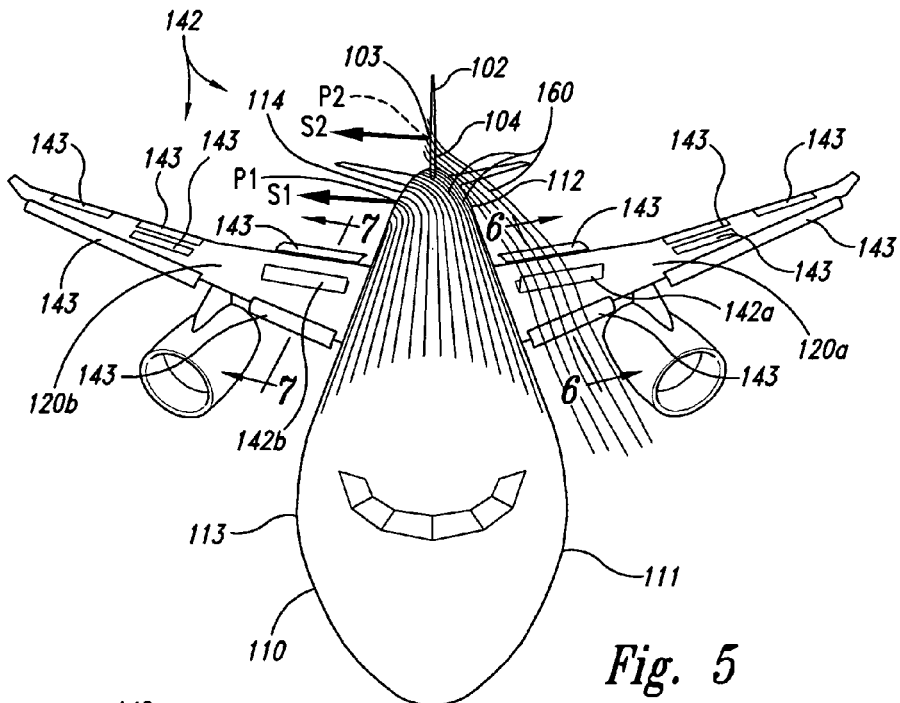
FIG. 5 is an isometric illustration of a portion of the system shown in FIG. 3, with the first control surface in a second deflected position and the second control surface in a second selected position.

In FIG. 4, the first control surface 142a has been moved to a first deflected position while the second control surface 142b has remained stationary. In the illustrated embodiment, the second control surface is in a first selected position (e.g., a non-deflected, faired, retracted, and/or stowed position). As used herein, a selected position can be any position of the second control surface 142b that allows the first control surface 142a, in a deflected position, to create at least one flow pattern proximate to the fuselage 110 that generates the first yawing moment YM1. As shown by the flow lines 160 in FIG. 4, the first control surface 142a accelerates portions of the fluid flow in some areas (e.g., where the flow lines 160 are close together), thereby increasing dynamic pressure and decreasing local or static pressure. Other portions of the flow can be decelerated, reducing dynamic pressure and increasing local or static pressure. Accordingly, a flow pattern is created proximate to the fuselage 110 that creates a pressure differential between the first portion 112 of the fuselage 110 and a second portion 114 of the fuselage 110. The pressure differential creates the first side force S1 that in turn produces the first yawing moment Ym1 (shown in FIG. 1). Similarly, the first control surface 142a creates a flow pattern proximate to the flow body 102 to create a pressure differential between the first portion 103 of the flow body 102 and a second portion 104 of the flow body 102. The pressure differential creates the second side force S2 that produces the second yawing moment Ym2 (shown in FIG. 1). In other embodiments, the first control surface 142a in the first deflected position only creates a single side force (e.g., only creates the first side force S1). In still other embodiments, the first control surface 142a in the first deflected position can create side forces and corresponding moments on other selected portions of the aerospace vehicle by affecting a flow pattern proximate to the selected portion of the vehicle.

Figure 6:
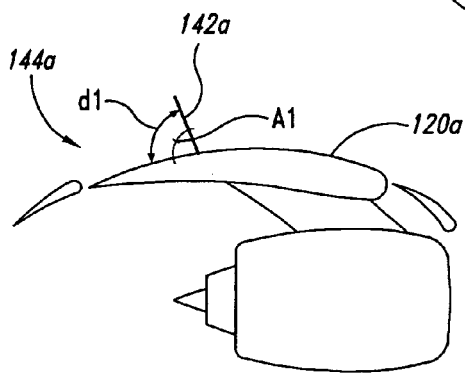
FIG. 6 is a partially schematic cross-sectional view of the portion of the system shown in FIG. 5 taken a long line 6—6.
Figure 7:
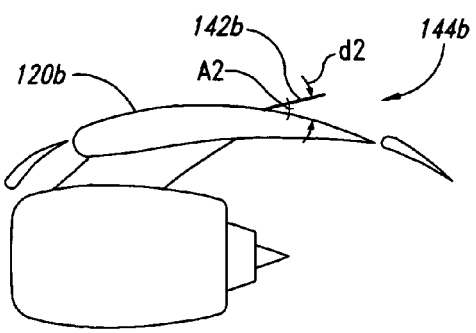
FIG. 7 is a partially schematic cross-sectional view of the portion of the system shown in FIG. 5 taken a long line 7—7.

In other embodiments, the first and second control surfaces 142a, 142b can have multiple selected and/or deflected positions. For example, FIG. 5 is an isometric illustration of a portion of the system 100 shown in FIG. 3, with the first control surface 142a in a second deflected position (e.g., a deflected position with greater deflection than that shown in FIG. 4) and the second control surface 142b in a second selected position (e.g., a non-retracted or non-faired position). FIG. 6 is a partially schematic cross-sectional view of the portion of the system 100 shown in FIG. 5 taken along line 6—6. FIG. 7 is a partially schematic cross-sectional view of the portion of the system 100 shown in FIG. 5 taken along line 7—7. In the second deflected position, the first control surface 142a is deflected a first amount 144a relative to the first wing section 120a (FIG. 6). In the second selected position, the second control surface 142b is deflected a second amount 144b relative to the second wing section 120b (FIG. 7). With the second control surface 142b in the second selected position and the first control surface 142a in the second deflected position, the first control surface 142a still creates a flow pattern proximate to the fuselage 110 to create a pressure differential. In turn, the pressure differential produces a yawing moment on the aerospace vehicle 101.

For example, as shown in FIGS. 6 and 7 the second amount of deflection 144b can be less than the first amount of deflection 144a and therefore it can have less impact on the flow pattern(s) proximate to the fuselage. The first and second amounts of deflection 144a, 144b can be measured using various types of units. For example, in certain embodiments the first amount of deflection 144a can include a first angular amount A1 (FIG. 6) between a reference associated with the first control surface 142a (e.g., a control surface chord line) and a reference associated with the first wing section 120a (e.g., a wing section chord line). In other embodiments, the first amount 144a of deflection includes a first linear or curvilinear distance d1 (FIG. 6) between a reference associated with the first control surface 142a and a reference associated with the wing section 120a. The second amount of deflection can also be measured in a generally similar manner, for example, as a second angular amount A2 (FIG. 7) or a second distance d2 (FIG. 7).

In certain embodiments, features discussed above with reference to FIGS. 5–7 can allow the first and second control surfaces to be used for other purposes while still providing directional stability and/or control. For example, if the first and second control surfaces 142a, 142b include spoiler surfaces, the spoiler surfaces can be deflected symmetrically relative to the X-Z plane of the fuselage to provide drag or to reduce lift without creating a yawing moment. The spoiler surfaces can also be differentially deflected, as shown in FIG. 5, to provide drag or reduce lift while producing a yawing moment. For example, if the control surfaces are extended to provide drag: (a) the deflection on one surface can be reduced (e.g., to a selected position) while the other surface remains fixed in the extended position (e.g., a deflected position); (b) the deflection of one surface can be increased (e.g., to a deflected position) while the other surface remains fixed in the extended position (e.g., a selected position); or (c) the deflection on one surface can be reduced (e.g., to a selected position) and the deflection on the other surface can be increased (e.g., to a deflected position) to provide a yawing moment on the aerospace vehicle.

In other embodiments, the system can have different arrangements. For example, in certain embodiments the flow patterns proximate to the fuselage can be asymmetrical, but positioned so that the net yawing moments about the yaw axis are balanced before the first or second control surface 142a, 142b is moved to a deflected position. In yet other embodiments, the first control surface 142a can be deflected in a downward direction to a third deflected position to affect the flow pattern proximate to bottom portions of the fuselage or other portions of the aerospace vehicle to generate a side force and produce a yawing moment. For example, the first control surface 142a could include a flap that is deflected downwardly to generate a side force and produce a yawing moment. In certain embodiments, the first control surface 142a can be deflected upwardly to a first deflected position as shown in FIG. 4 and the second control surface 142b can be deflected downwardly to the third deflected position to create one or more flow patterns on various portions of the fuselage 110 to produce one or more yawing moments on the aerospace vehicle.

A feature of at least some of the embodiments discussed above is that a control surface coupled to a wing section can be used to produce a yawing moment on an aerospace vehicle. For example, spoiler surfaces can be used to provide directional stability and/or control during one or more selected operating conditions. In certain embodiments, this feature can allow a reduction in vertical tail size or a reduction in minimum control speed (e.g., on the ground or in flight) because the spoiler surface can be used to augment yaw control during an asymmetric thrust condition at low air speeds. For example, if an aircraft loses an engine at low speed during the takeoff roll, a control surface can be moved to a deflected position to create a pressure differential on the fuselage. In turn, the differential pressure can create a yawing moment that aids the rudder and vertical tail surfaces in opposing the yawing moment generated by the engine-out condition. As the aircraft continues to accelerate during the takeoff roll and the rudder and vertical tail surfaces become more effective, the spoiler surface can be stowed. An advantage to this feature is that a lower minimum control speed can allow the aircraft to take off with more weight. Another advantage of this feature is that the vertical tail size of an aircraft can be reduced while maintaining the same minimum control speed, requiring less material to produce the vertical tail, and thereby reducing manufacturing costs and aircraft weight as compared to aircraft requiring a larger vertical tail. A smaller vertical tail can also result in less drag, resulting in a reduction in operating cost. In the limit, the tail can be eliminated.

The power of the rudder actuator can also affect the minimum control speeds associated with an aircraft. For example, in certain situations a more powerful rudder actuator can move a rudder surface to a position required to compensate for an engine loss more quickly than a less powerful actuator. Additionally, in certain instances a more powerful rudder actuator can deflect a rudder surface a larger amount against specified aerodynamic loads than a less powerful actuator, thereby providing a larger yawing moment to compensate for the yaw created by the engine loss. A feature of some of the embodiments described above is that a control surface can be moved to a deflected position to create a pressure differential on a fuselage. In turn, the differential pressure can create a yawing moment that aids the yawing moment created by the rudder surface. Accordingly, under certain circumstances, various embodiments of the invention can allow a less powerful rudder actuator to be used on a specified aircraft while maintaining the same minimum control speed(s). An advantage of this feature is that less powerful actuators can be less expensive to produce and maintain, thereby allowing manufacturing and maintenance costs to be reduced. In some cases, actuators (e.g., redundant actuators) can be eliminated and instead the control surface used to create a differential pressure on the fuselage can be relied on to provide backup yaw control and/or stability.

Because a control surface can be used to create a pressure differential on a fuselage, thereby creating a yawing moment, larger engines can be installed on an aircraft (a) while retaining the same minimum control speed(s) associated with the smaller engines and (b) without increasing the size of the vertical tail surfaces, the size of the rudder surfaces, and the power of the rudder actuators. For example, in certain circumstances a flight control computer can be programmed (e.g., reprogrammed) to reschedule the use of the control surface and/or the flight control computer can be programmed to account for increases in thrust. An advantage of this feature is that larger engines can be installed on aircraft without the associated expense of modifying the vertical tail, rudder surfaces, and/or rudder actuators.

In other embodiments, the control surface(s) can be used to reduce the size of various stability surfaces during various operating conditions. For example, the control surface(s) can be used to augment directional stability and/or provide directional control during extreme operating conditions (e.g., at a corner of a flight envelope) or with various system failures. By reducing the size or eliminating various stability surfaces or control devices, aircraft weight and drag can be reduced providing a savings in operating costs.

Figure 8:
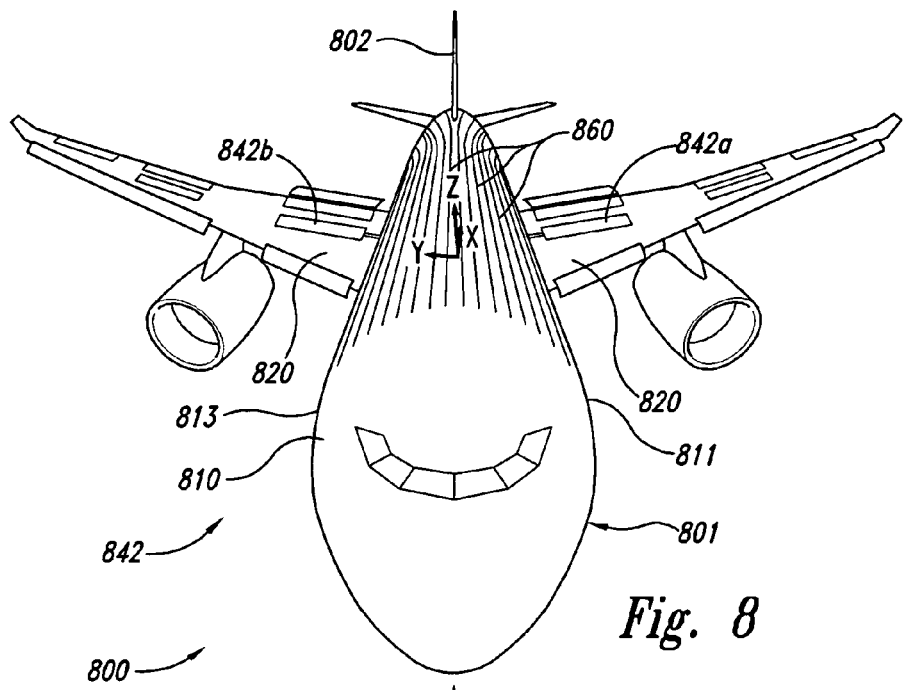
FIG. 8 is an isometric illustration of a system for creating a yawing moment with control surfaces coupled to a fuselage of an aerospace vehicle in accordance with other embodiments of the invention.

In other embodiments, the yaw generating system can have other arrangements. For example, a yaw generating system 800 can have control surfaces 842 coupled to a fuselage 810 of an aerospace vehicle 801 without being connected to wing sections 820. In FIG. 8, the yaw generating system 800 includes two control surfaces 842, shown as a first control surface 842a coupled to a first side 811 of the fuselage 810 and a second control surface 842b coupled to a second side 813 of the fuselage 810. In the illustrated embodiment, the control surfaces 842 can extend generally in a horizontal plane and can be positioned above the wing sections 820. For example, the control surfaces 842 can extend generally in an X-Y plane with or without anhedral or dihedral (e.g., the control surfaces can generally extend more horizontally than vertically). In FIG. 8 the control surfaces 842 are symmetrically positioned with respect to the fuselage and the flow lines 860 created by a flow field F illustrates that the flow patterns proximate to the fuselage 810 and a flow body 802 (e.g., a vertical tail) are at least approximately symmetrical relative to the X-Z plane.

Figure 9:
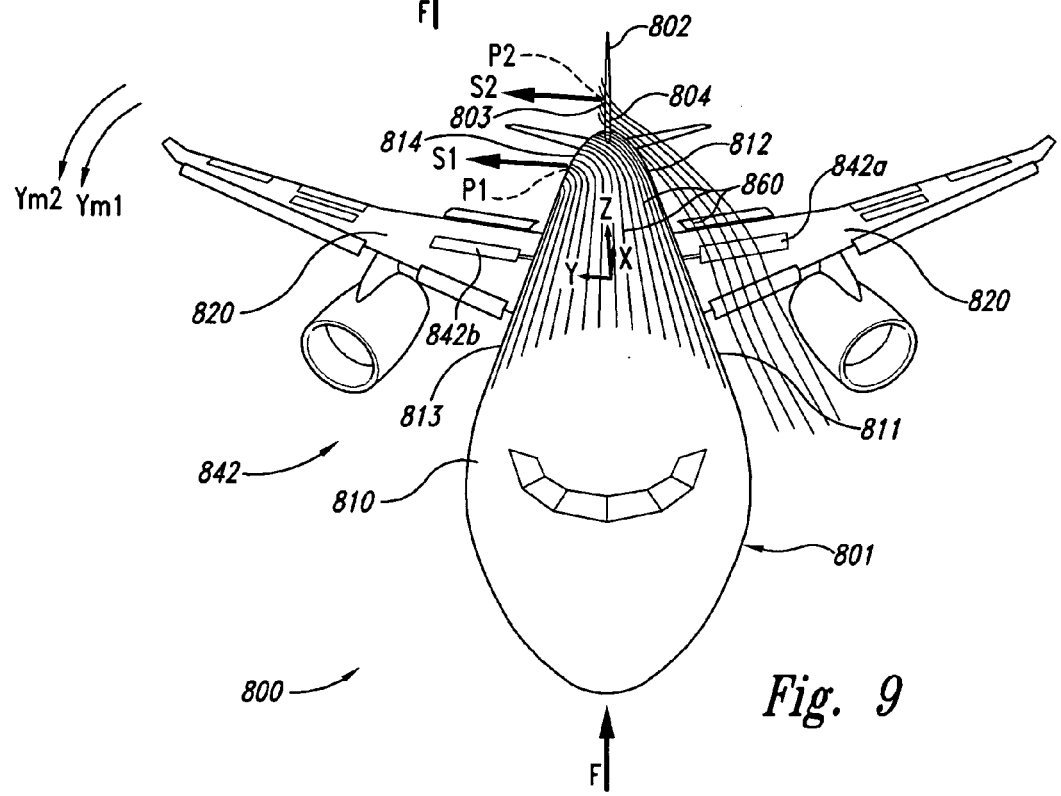
FIG. 9 is an isometric illustration of the system shown in FIG. 8, with a first control surface in a deflected position and a second control surface in a selected position.

In FIG. 9, the first control surface 842a has been moved to a deflected position while the second control surface 842b has remained stationary. As discussed above with reference to FIG. 4, the second control surface 842b is in a selected position and the first control surface 842a can create a flow pattern proximate to the fuselage 810 that creates a pressure first differential between a first portion 812 of the fuselage 810 and a second portion 814 of the fuselage 810. The first pressure differential creates a first side force S1 extending outwardly from the second side 813 of the fuselage 810 and away from the first side 811 of the fuselage 810. The first side force S1 can in turn produces a first yawing moment Ym1. Similarly, the first control surface 842a can create a second flow pattern proximate to the flow body 802 to create a pressure differential between the first portion 803 of the flow body 802 and a second portion 804 of the flow body 802. The second pressure differential creates a second side force S2 (e.g., in the same direction as the first side force S1) that can produce a second yawing moment Ym2.

The yaw generating system 800 shown in FIGS. 8–9 can have similar features and/or advantages to those discussed above with reference to FIGS. 1–7. For example, in other embodiments the yaw generating system 800 can include more or fewer control surfaces 842 and/or the control surfaces 842 can have additional positions (e.g., additional selected and/or deflected positions). Additionally, in other embodiments the control surfaces 842 can have other locations relative to the fuselage 810 and/or wing sections 820. For example, although in the illustrated embodiment the control surfaces 842 are positioned proximate to the upper surface of the wing sections 820 where there can be high energy airflow (e.g., the control surfaces 842 are aerodynamically coupled to the wing section 820), in other embodiments the control surfaces 842 are positioned away from the wing sections.

Figure 10:
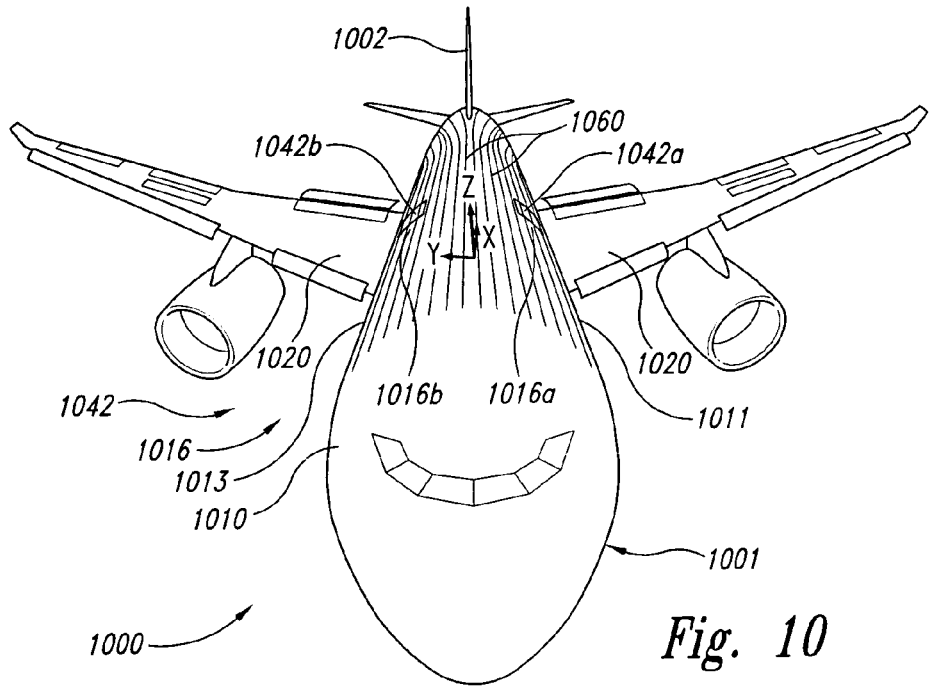
FIG. 10 is an isometric illustration of a system for creating a yawing moment with other control surfaces coupled to a fuselage of an aerospace vehicle in accordance with still other embodiments of the invention.

FIG. 10 is an isometric illustration of a yaw generating system 1000 having yet another arrangement. In FIG. 10, the yaw generating system 1000 includes a first control surface 1042a coupled to a first side 1011 of a fuselage 1010 and a second control surface 1042b coupled to a second side 1013 of the fuselage 1010. The control surfaces 1042 can be movable between a stowed position and a deflected position. In the stowed position the control surfaces 1042 can be generally faired with a surface 1016 of the fuselage 1010. For example, the control surfaces 1042 can be retracted into or against the fuselage 1010, retracted to be flush with a surface 1016 of the fuselage 1010, and/or positioned proximate to the fuselage 1010 so that the control surface 1042 has little interference with the generally streamlined flow around the fuselage 1010. In the illustrated embodiment the first control surface 1042a is generally faired with a first surface 1016a and the second control surface 1016b is generally faired with a second surface of the fuselage 1016b. Because the first and second control surfaces 1042a, 1042b are symmetrically positioned with respect to the fuselage and the flow lines 1060 created by a flow field F illustrates that the flow patterns proximate to the fuselage 1010 and a flow body 1002 (e.g., a vertical tail) are at least approximately symmetrical relative to the X-Z plane.

Figure 11:
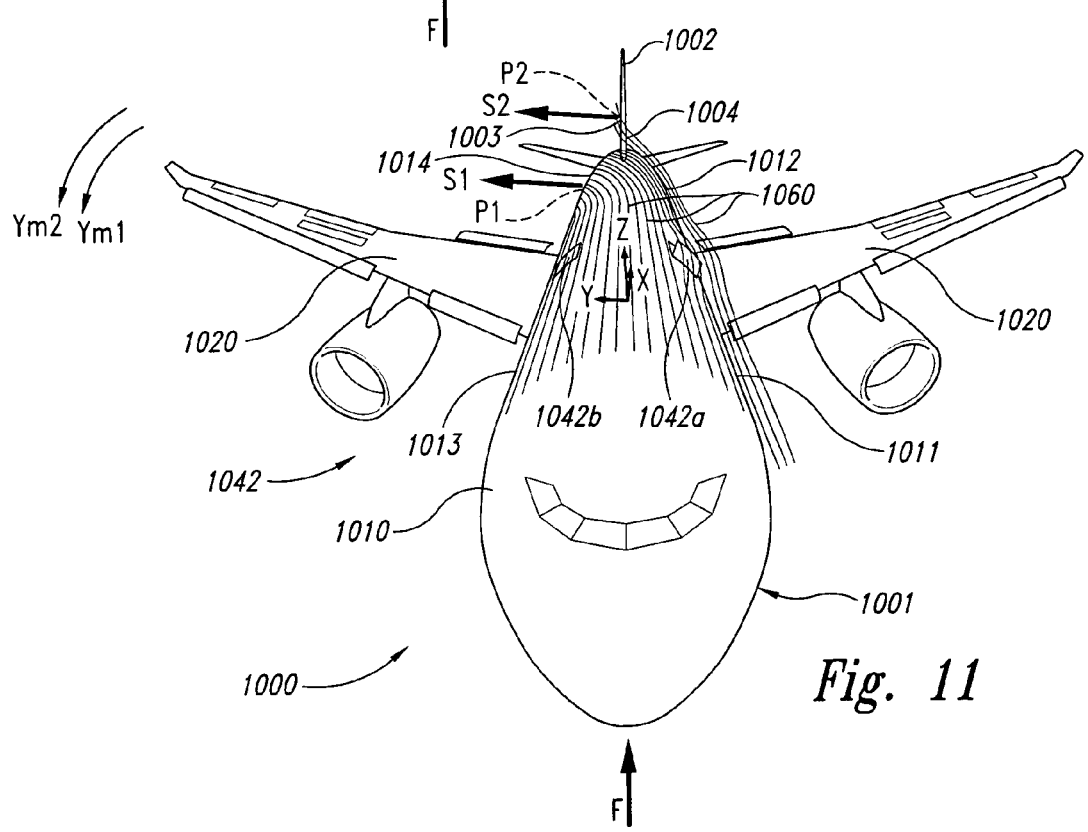
FIG. 11 is an isometric illustration of the system shown in FIG. 10, with a first control surface in a deflected position and a second control surface in a selected position.

In FIG. 11, the first control surface 1042a has been moved to a deflected position where the control surface 1042a extends outwardly from the first side 1011 of the fuselage 1010 and away from the second side 1013 of the fuselage 1010. In FIG. 11, the second control surface 1042b has remained in the stowed position, which is also a selected position as discussed above with reference to FIG. 4. Accordingly, in the deflected position the first control surface 1042a can create a flow pattern proximate to the fuselage 1010 that creates a first pressure differential between a first portion 1012 of the fuselage 1010 and a second portion 1014 of the fuselage 1010. The first pressure differential creates a first side force S1 extending outwardly from the second side 1013 of the fuselage 1010 and away from the first side 1011. The First side force S1 can in turn produces a first yawing moment Ym1. Similarly, the first control surface 1042a can create a second flow pattern proximate to the flow body 1002 to create a pressure differential between the first portion 1003 of the flow body 1002 and a second portion 1004 of the flow body 1002. The second pressure differential creates a second side force S2 (e.g., in the same direction as the first side force S1) that can produce the second yawing moment Ym2.

The yaw generating system 1000 shown in FIGS. 10–11 can have similar features and/or advantages to those discussed above with reference to FIGS. 1–9. For example, in other embodiments the yaw generating system 1000 can include more or fewer control surfaces 1042 and/or the control surfaces 1042 can have additional positions (e.g., additional selected and/or deflected positions). For example, in certain embodiments the control surfaces 1042 can be extended symmetrically to act as a speed brake without creating a yawing moment on the aerospace vehicle 1001 and extended asymmetrically to provide drag and a yaw producing flow pattern on the fuselage (as discussed above). Additionally, as discussed above with reference to FIGS. 8–9, in other embodiments the control surfaces 1042 can have other locations relative to the fuselage 1010 and/or wing sections 1020.

From the foregoing, it will be appreciated that specific embodiments of the invention have been described herein for purposes of illustration, but that various modifications may be made without deviating from the invention. Additionally, aspects of the invention described in the context of particular embodiments may be combined or eliminated in other embodiments. For example, although some of the above embodiments have shown a single control surface on a wing section, in other embodiments a wing section can have multiple control surfaces having the same or different deflected positions. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. A yaw generating system, comprising:
an aerospace vehicle having a fuselage with a first portion and a second portion;
a wing section coupled to the fuselage; and
a movable control surface attached directly to the wing section and extending generally in a horizontal plane, the control surface being movable to a deflected position in which the control surface is positioned to create a flow pattern proximate to the fuselage when the aerospace vehicle is located in a flow field, the flow pattern being positioned to create a pressure differential between the first portion of the fuselage and the second portion of the fuselage, the first and second portions being located so that the pressure differential produces a yawing moment on the aerospace vehicle, wherein the movable control surface includes a spoiler surface.

2. The system of claim 1, wherein the wing section includes a first wing section, the yawing moment includes a first yawing moment and the spoiler surface includes a first spoiler surface attached to the first wing section and located proximate to a first side of the fuselage opposite a second side of the fuselage, and wherein the pressure differential between the first portion of the fuselage and the second portion of the fuselage creates a side force that produces the first yawing moment, the side force having a direction extending outwardly from the fuselage and away from the second side of the fuselage, and wherein the system further comprises: a second wing section located proximate to the fuselage and positioned generally opposite the first wing section relative to the fuselage; a second movable spoiler surface coupled to the second wing section, the first and second spoiler surfaces being at least approximately symmetrically located in the horizontal plane with respect to the fuselage, the second spoiler surface being positionable to a selected position when the first spoiler surface is placed in the deflected position; at least one of a mechanical flight control system and an electronic flight control system operatively coupled to the first spoiler surface to move the first spoiler surface to the deflected position when an asymmetric thrust condition creates a second yawing moment on the aerospace vehicle at one or more selected operating conditions, the first yawing moment being at least approximately opposite the second yawing moment; and a vertical stabilizer coupled to the fuselage, the vertical stabilizer having a rudder surface that is movable to produce a third yawing moment, the third yawing moment at least approximately opposite the second yawing moment.

3. The system of claim 1 wherein the control surface is located proximate to a first side of the fuselage opposite a second side of the fuselage, and wherein the pressure differential between the first portion of the fuselage and the second portion of the fuselage creates a side force that produces the yawing moment, the side force having a direction extending outwardly from the fuselage and away from the second side of the fuselage.

4. The system of claim 1, further comprising an electronic flight control system having a computer programmed to determine commands for the control surface, the electronic flight control system being operatively coupled to the control surface to move the control surface to the deflected position at one or more selected operating conditions in response to the commands.

5. The system of claim 1 wherein the flow pattern proximate to the fuselage includes a first flow pattern, the pressure differential includes a first pressure differential, and the yawing moment includes a first yawing moment, and wherein the system further comprises a flow body having a first portion and a second portion, the control surface in the deflected position being positioned to create a second flow pattern proximate to the flow body when the aerospace vehicle is located in the flow field, the second flow pattern being positioned to create a second pressure differential between the first portion of the flow body and the second portion of the flow body, the first and second portions of the flow body being located so that the second pressure differential produces a second yawing moment on the aerospace vehicle in the same direction as the first yawing moment.

6. The system of claim 1 wherein the control surface in the deflected position is positioned to create a flow pattern proximate to the fuselage to create a pressure differential between the first portion of the fuselage and the second portion of the fuselage while creating an at least approximately balanced net rolling moment on the aerospace vehicle when the vehicle is located in the flow field at one or more selected operating conditions.

7. The system of claim 1 wherein the control surface includes a first control surface, and wherein the system further comprises a second movable control surface coupled to the fuselage and extending generally in a horizontal plane, the first and second control surfaces being at least approximately symmetrically located with respect to the fuselage, the second control surface being positionable to a selected position when the first control surface is placed in the deflected position.

8. The system of claim 1 wherein the yawing moment includes a first yawing moment on the aerospace vehicle and wherein the control surface in the deflected position is positioned to create a drag force that produces a second yawing moment on the aerospace vehicle, the second yawing moment being smaller than the first yawing moment.

9. The system of claim 1 wherein the movable control surface includes a first control surface, the pressure differential includes a first pressure differential, and the fuselage includes a third portion, a fourth portion, a first side, and a second side opposite the first side, and wherein the system further comprises:
   a second control surface coupled to the fuselage and movable between a stowed
      position and a deflected position, in the stowed position the second control surface being generally faired with a surface of the fuselage, in the deflected position the second control surface extending outwardly from the first side of the fuselage and away from the second side of the fuselage, and being positioned to create a flow pattern proximate to the fuselage when the aerospace vehicle is located in the flow field, the flow pattern being positioned to create a second pressure differential between the third portion of the fuselage and the fourth portion of the fuselage, the third and fourth portions of the fuselage being located so that the second pressure differential produces a yawing moment on the aerospace vehicle.

10. A method for making a yaw generating system, wherein the method comprises:
   locating a movable control surface proximate to a fuselage of an aerospace vehicle, the fuselage having a first portion and a second portion;
   coupling a wing section to the fuselage; and
   attaching the movable control surface directly to the wing section, the control surface extending generally in a horizontal plane and being movable to a deflected position, in the deflected position the control surface being positioned to create a flow pattern when the aerospace vehicle is located in a flow field, the flow pattern being located to create a pressure differential between the first portion of the fuselage and the second portion of the fuselage, the first and second portions of the fuselage being located so that the pressure differential produces a yawing moment on the aerospace vehicle, wherein the movable control surface includes a spoiler surface.

11. The method of claim 10 wherein:
   coupling a wing section includes coupling a first wing section to a first side of the fuselage opposite a second side of the fuselage;
   the spoiler surface includes a first spoiler surface; and
   the flow pattern is located to create a pressure differential includes the flow pattern being located to create a pressure differential between the first portion of the fuselage and the second portion of the fuselage to create a side force, the side force producing the yawing moment, the side force having a direction extending outwardly from the fuselage and away from the second side of the fuselage, the yawing moment including a first yawing moment; and wherein the method further comprises:
      coupling a second wing section to the fuselage generally opposite the first wing section relative to the fuselage;
      coupling a second spoiler surface to the second wing section, the first and second spoiler surfaces being at least approximately symmetrically located in the horizontal plane with respect to the fuselage, the second spoiler surface being positionable to a selected position when the first control surface is placed in the deflected position;
      configuring a control system to move the control surface to the deflected position when an asymmetric thrust condition creates a second yawing moment on the aerospace vehicle, the first yawing moment being at least approximately opposite the second yawing moment; and
      positioning a rudder surface to create a third yawing moment on the aerospace vehicle, the third yawing moment being at least approximately opposite the second yawing moment.

12. The method of claim 10 wherein in the deflected position the control surface being positioned to create a flow pattern located to create a pressure differential between the first portion of the fuselage and the second portion of the fuselage to produce a yawing moment on the aerospace vehicle includes the control surface being positioned to create a first flow pattern to create a first pressure differential to produce a first yawing moment and to create a second flow pattern proximate to a flow body to create a second pressure differential between a first portion of the flow body and a second portion of the flow body to produce a second yawing moment on the aerospace vehicle in the same direction as the first yawing moment.

13. The method of claim 10 wherein in the deflected position the control surface being positioned to produce a yawing moment on the aerospace vehicle includes in the deflected position the control surface being positioned to produce a first yawing moment on the aerospace vehicle, and wherein the method further includes configuring a control system to move the control surface to the deflected position when a rudder surface is positioned to create a second yawing moment on the aerospace vehicle, the first yawing moment and the second yawing moment being at least approximately in a same direction.

14. The method of claim 10 wherein the method further comprises operatively coupling an electronic flight control system having a computer programmed to determine commands for the control surface to the control surface, the electronic flight control system being configured to move the control surface to the deflected position at one or more selected operating conditions in response to the commands.

15. The method of claim 10 wherein the method further comprises configuring the control surface to create the pressure differential while creating an at least approximately balanced net rolling moment on the aerospace vehicle when the aerospace vehicle is located in the flow field at one or more selected operating conditions.

16. The method of claim 10 wherein coupling a wing section includes coupling a first wing section and attaching a movable control surface includes attaching a first movable control surface to the first wing section; and wherein the method further comprises:
   coupling a second wing section to the fuselage generally opposite the first wing section relative to the fuselage; and
   coupling a second movable control surface to the second wing section, the first and second control surfaces being at least approximately symmetrically located in the horizontal plane with respect to the fuselage, the second control surface being positionable to a selected position when the first control surface is placed in the deflected position.

17. The method of claim 10 wherein the control surface in the deflected position being positioned to produce a yawing moment on the aerospace vehicle includes the control surface in the deflected position being positioned to create a first yawing moment and wherein the control surface in the deflected position is configured to create a drag force that produces a second yawing moment on the aerospace vehicle, the second yawing moment being smaller than the first yawing moment.

18. A method for creating a yawing moment, wherein the method comprises:
placing an aerospace vehicle in a flow field; and
positioning a control surface in a deflected position to create a pressure differential between a first portion of a fuselage and a second portion of the fuselage, the pressure differential producing a yawing moment on the aerospace vehicle, the control surface being attached directly to a wing section coupled to the fuselage, the control surface extending generally in a horizontal plane, wherein the control surface includes a spoiler surface.

19. The method of claim 18 wherein:
positioning a control surface in a deflected position includes positioning the spoiler surface in a deflected position in response to a command from a flight control computer to create a pressure differential between the first portion of the fuselage and the second portion of the fuselage, the spoiler surface being located proximate to a first side of the fuselage opposite a second side of the fuselage, the pressure differential creating a side force having a direction extending outwardly from the fuselage and away from the second side of the fuselage to produce a first yawing moment, the first yawing moment being at least approximately opposite a second yawing moment created by an asymmetric thrust condition on the aerospace vehicle; and wherein the method further comprises:
positioning a rudder surface to create a third yawing moment on the aerospace vehicle, the third yawing moment being at least approximately opposite the second yawing moment.

20. The method of claim 18 wherein positioning a control surface in a deflected position includes positioning a control surface in a deflected position to create a first pressure differential to produce a first yawing moment and to create a second pressure differential between a first portion of a flow body and a second portion of the flow body to produce a second yawing moment in a same direction as the first yawing moment.

21. The method of claim 18, further comprising moving a second control surface to a selected position, the second control surface being coupled to the fuselage and extending generally in a horizontal plane, the first and second control surfaces being at least approximately symmetrically located in the horizontal plane with respect to the fuselage.

22. The method of claim 18 wherein the method further comprises using a computer to determine at least one of when to position the control surface to the deflected position, an amount of control deflection associated with the deflected position, and an amount of time the control surface remains in the deflected position based on an operating condition.

23. The method of claim 18 wherein positioning a control surface in a deflected position includes positioning a control surface in a deflected position to create a pressure differential to produce a yawing moment while creating an at least approximately balanced net rolling moment on the aerospace vehicle when the vehicle is placed in the flow field at one or more selected operating conditions.

24. The method of claim 18 wherein the yawing moment is a first yawing moment and wherein positioning a control surface includes creating a drag force that produces a second yawing moment, the second yawing moment being smaller than the first yawing moment.

* * * * *

UNITED STATES PATENT AND TRADEMARK OFFICE
CERTIFICATE OF CORRECTION

| | |
|---|---|
| PATENT NO. | : 7,367,530 B2 |
| APPLICATION NO. | : 11/158198 |
| DATED | : May 6, 2008 |
| INVENTOR(S) | : Harrigan et al. |

It is certified that error appears in the above-identified patent and that said Letters Patent is hereby corrected as shown below:

In column 13, line 62, in Claim 2, delete "the" and insert -- a --, therefor.

In column 13–14, line(s) 59–67 & 1–22, in Claim 2, delete "The system of claim 1, wherein the wing section includes a first wing section, the yawing moment includes a first yawing moment and the spoiler surface includes a first spoiler surface attached to the first wing section and located proximate to a first side of the fuselage opposite a second side of the fuselage, and wherein the pressure differential between the first portion of the fuselage and the second portion of the fuselage creates a side force that produces the first yawing moment, the side force having a direction extending outwardly from the fuselage and away from the second side of the fuselage, and wherein the system further comprises: a second wing section located proximate to the fuselage and positioned generally opposite the first wing section relative to the fuselage; a second movable spoiler surface coupled to the second wing section, the first and second spoiler surfaces being at least approximately symmetrically located in the horizontal plane with respect to the fuselage, the second spoiler surface being positionable to a selected position when the first spoiler surface is placed in the deflected position; at least one of a mechanical flight control system and an electronic flight control system operatively coupled to the first spoiler surface to move the first spoiler surface to the deflected position when an asymmetric thrust condition creates a second yawing moment on the aerospace vehicle at one or more selected operating conditions, the first yawing moment being at least approximately opposite the second yawing moment; and a vertical stabilizer coupled to the fuselage, the vertical stabilizer having a rudder surface that is movable to produce a third yawing moment, the third yawing moment at least approximately opposite the second yawing moment."

and insert -- The system of claim 1, wherein the wing section includes a first wing section, the yawing moment includes a first yawing moment and the spoiler surface includes a first spoiler surface attached to the first wing section and located proximate to a first side of the fuselage opposite a second side of the fuselage, and wherein the pressure differential between the first portion of the fuselage and the second portion of the fuselage creates a side force that produces the first yawing moment, the side force having a direction extending outwardly from the fuselage and away from the second side of the fuselage, and wherein the system further comprises:
    a second wing section located proximate to the fuselage and positioned
        generally opposite the first wing section relative to the fuselage;
    a second movable spoiler surface coupled to the second wing section, the first
        and second spoiler surfaces being at least approximately symmetrically
        located in the horizontal plane with respect to the fuselage, the second
        spoiler surface being positionable to a selected position when the first
        control surface is placed in the deflected position;

UNITED STATES PATENT AND TRADEMARK OFFICE
CERTIFICATE OF CORRECTION

PATENT NO. : 7,367,530 B2
APPLICATION NO. : 11/158198
DATED : May 6, 2008
INVENTOR(S) : Harrigan et al.

It is certified that error appears in the above-identified patent and that said Letters Patent is hereby corrected as shown below:

at least one of a mechanical flight control system and an electronic flight control system operatively coupled to the first spoiler surface to move the first spoiler surface to the deflected position when an asymmetric thrust condition creates a second yawing moment on the aerospace vehicle at one or more selected operating conditions, the first yawing moment being at least approximately opposite the second yawing moment; and
a vertical stabilizer coupled to the fuselage, the vertical stabilizer having a rudder surface that is movable to produce a third yawing moment, the third yawing moment at least approximately opposite the second yawing moment. --, therefor.

In column 17, line 35, in Claim 19, delete "fuselage," and insert -- fuselage --, therefor.

Signed and Sealed this

Eleventh Day of November, 2008

JON W. DUDAS
*Director of the United States Patent and Trademark Office*